(12) United States Patent
Yeo et al.

(10) Patent No.: US 9,743,729 B2
(45) Date of Patent: Aug. 29, 2017

(54) PROTECTION COVER

(71) Applicant: Samsung Electronics Co., Ltd., Gyeonggi-do (KR)

(72) Inventors: Jung-Min Yeo, Seoul (KR); Kuk-Hwan Kim, Seoul (KR); In-Young Yeo, Seoul (KR); Jae-Ho Baik, Gyeonggi-do (KR); Min-Hyouk Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 82 days.

(21) Appl. No.: 14/550,057

(22) Filed: Nov. 21, 2014

(65) Prior Publication Data
US 2015/0189962 A1 Jul. 9, 2015

(30) Foreign Application Priority Data

Jan. 3, 2014 (KR) .................. 10-2014-0000948

(51) Int. Cl.
*G06F 1/16* (2006.01)
*A45C 11/00* (2006.01)

(52) U.S. Cl.
CPC ............ *A45C 11/00* (2013.01); *G06F 1/1669* (2013.01); *A45C 2011/003* (2013.01)

(58) Field of Classification Search
CPC .... G06F 1/1607; G06F 1/1628; G06F 1/1669; G06F 1/1679; G06F 2200/1633; G06F 2200/1634
USPC .................................................. 361/679.17
See application file for complete search history.

(56) References Cited

U.S. PATENT DOCUMENTS

| | | | | |
|---|---|---|---|---|
| 4,532,162 A * | 7/1985 | Neece | ..................... | B60R 11/00 248/27.1 |
| 4,573,573 A * | 3/1986 | Favaro | ................... | H04R 1/021 206/216 |
| 4,759,812 A * | 7/1988 | Miller | ..................... | B29C 65/56 156/94 |
| 4,918,750 A * | 4/1990 | Buckley | ................. | B60R 11/00 428/100 |
| 5,551,497 A * | 9/1996 | Stanley | ...................... | B41J 5/08 150/154 |
| 8,072,749 B1 * | 12/2011 | Chen | ...................... | G06F 1/1626 312/223.1 |
| 8,139,348 B2 * | 3/2012 | Ruch | ..................... | G06F 1/1616 206/763 |
| 8,289,702 B2 * | 10/2012 | Karwan | ................ | G06F 1/1632 361/679.55 |
| 8,383,216 B1 * | 2/2013 | Hynecek | .............. | B29D 22/003 156/242 |
| 8,640,868 B2 * | 2/2014 | O'Dowd | ............... | G06F 1/1628 206/320 |
| 9,182,785 B2 * | 11/2015 | Wyner | ................... | A45C 11/00 |
| 2004/0025993 A1 * | 2/2004 | Russell | ................. | F16M 11/00 150/154 |

(Continued)

*Primary Examiner* — Anthony Q Edwards
(74) *Attorney, Agent, or Firm* — The Farrell Law Firm, P.C.

(57) ABSTRACT

An attaching and detaching device of a protection cover for protecting an electronic device is provided. The attaching and detaching device includes one or more hook units provided on the protection cover; and one or more attaching and detaching units which are provided at positions corresponding to the hook units on a rear surface of the electronic device, and are latched and fixed to or released from the hook units.

21 Claims, 11 Drawing Sheets

(56) References Cited

U.S. PATENT DOCUMENTS

| | | | |
|---|---|---|---|
| 2004/0174670 A1* | 9/2004 | Huang | G06F 1/1626 361/679.17 |
| 2004/0190239 A1* | 9/2004 | Weng | G06F 1/1616 361/679.2 |
| 2005/0045415 A1* | 3/2005 | Popken | H04R 1/026 181/150 |
| 2009/0114556 A1* | 5/2009 | Tai | H04M 1/185 206/320 |
| 2009/0181229 A1* | 7/2009 | Mase | B29C 63/02 428/214 |
| 2010/0151305 A1* | 6/2010 | Ouyang | E05B 17/0033 429/97 |
| 2011/0063788 A1* | 3/2011 | Li | G06F 1/1662 361/679.11 |
| 2011/0188176 A1* | 8/2011 | Kim | H05K 7/00 361/679.01 |
| 2012/0024733 A1* | 2/2012 | Hwang | F16M 13/00 206/320 |
| 2012/0068919 A1 | 3/2012 | Lauder et al. | |
| 2012/0106078 A1* | 5/2012 | Probst | G06F 1/1616 361/679.56 |
| 2012/0211377 A1* | 8/2012 | Sajid | G06F 1/1628 206/216 |
| 2012/0327580 A1* | 12/2012 | Gengler | G06F 1/1626 361/679.09 |
| 2013/0033806 A1* | 2/2013 | Rochna | G06F 1/1628 361/679.01 |
| 2013/0279096 A1* | 10/2013 | Gengler | H05K 7/00 361/679.01 |
| 2013/0294020 A1* | 11/2013 | Rayner | H05K 5/061 361/679.01 |
| 2014/0061084 A1* | 3/2014 | Westrup | A45C 13/02 206/472 |
| 2014/0103789 A1* | 4/2014 | Cox, III | H05K 5/02 312/280 |
| 2014/0159405 A1* | 6/2014 | Potter | A45F 5/10 294/160 |
| 2015/0102073 A1* | 4/2015 | Pusateri | H04B 1/3888 224/191 |
| 2015/0111623 A1* | 4/2015 | Hegemier | H04M 1/0283 455/575.1 |
| 2015/0122851 A1* | 5/2015 | Mulhern | G06F 1/1626 224/191 |
| 2015/0162515 A1* | 6/2015 | Shiu | H04B 1/3888 455/575.8 |

* cited by examiner

PROTECTION COVER

PRIORITY

This application claims priority under 35 U.S.C. §119(a) to Korean Patent Application Ser. No. 10-2014-0000948, which was filed in the Korean Intellectual Property Office on Jan. 3, 2014, the entire content of which is incorporated herein by reference.

BACKGROUND

1. Field of the Invention

The present invention generally relates to a protection cover for protecting an electronic device, and more particularly, to an attaching and detaching device of a protecting cover.

2. Description of the Related Art

Electronic devices, such as a portable phone, an MP3 player, a portable multimedia player (PMP), a tablet Personal Computer (PC), a Galaxy Tab, an I-Pad, and an E-book reader have become popular, and a user can use various contents while carrying such an electronic device.

The user can communicate with a companion while carrying the portable electronic device. The portable electronic device includes a display unit, an antenna unit, an input/output unit, and a data transmission and reception unit.

Further, as the portable electronic device has been miniaturized and has become lightweight, the user can use the portable electronic device while carrying it, or storing it in a pocket or a bag. The portable electronic device is typically mounted it on a separate protection cover in order to safely protect the portable electronic device because the portable electronic device may be damaged while to carrying and storing it.

As shown in FIG. 1, a typical protection cover 2 includes a rear cover 2a for enclosing a rear surface and a side surface of a portable electronic device (not shown) without enclosing a front surface on which a screen is arranged, and a holding portion 2b.

Further, another type of protection cover includes a front and rear cover for covering front and rear surfaces of the portable electronic device, and a connection unit arranged between the front cover and the rear cover, for rotating the front cover from the portable electronic device.

The rear cover typically has four fixing units coupled to corners of the portable electronic device so as to fix the cover to the portable electronic device. Such a protection cover is referred to as a flip-type protection cover.

However, since the conventional protection cover has a structure in that it is coupled with the electronic device by using the holding portion for enclosing an outer surface of the electronic device and the fixing units, there are disadvantages in that the protection cover has an increased weight and a thickness due to the holding portion and the fixing units, and affects the slimness and the weight of a product. Further, the protection cover has a side whose a thickness increases, and there is a disadvantage in that a grip of the protection cover is deteriorated.

Accordingly, there is required a device in which the protection cover is capable of being attached and detached to/from the electronic device without a conventional holding portion and fixing units in order to reduce the thickness and weight of the protection cover.

SUMMARY

The present invention has been made to address the above mentioned disadvantages and problems in the conventional art, and to provide at least the the advantages described below. Accordingly, an aspect of the present invention is to provide an attaching and detaching device of a protection cover, which has one or more hook units and one or more attaching and detaching units capable of latching and fixing or releasing the protection cover as an electronic device is attached to and detached from the protection cover thereby reducing a thickness and a weight of the protection cover, achieving slimness and making the protection cover lightweight, and improving a grip of the protection cover and the electronic device according to a reduction of a thickness of the protection cover.

Another aspect of the present invention is to provide an attaching and detaching device of a protection cover, which is configured to detachably attach the protection cover to an electronic device by using a magnetic force of a magnet, thereby easily combining the protection cover with the electronic device.

Another aspect of the present invention is to provide an attaching and detaching device of a protection cover, which has a hook unit of the protection cover integrally formed in a rear surface of an electronic device and detachably attached to an opening portion, thereby easily attaching and detaching the protection cover to the electronic device, and decreasing a manufacturing cost and an assembling process through a reduction of parts.

Another aspect of the present invention is to provide a keyboard attaching and detaching device of an electronic device, which has one or more attaching and detaching units capable of attaching and detaching a front surface or a rear surface of the keyboard to/from the electronic device as one or more hook units disposed on the electronic device are attached to and detached from the front surface or the rear surface of the keyboard, thereby protecting keys provided on the keyboard of the electronic device and improving use of the keyboard.

In accordance with an aspect of the present invention, an attaching and detaching device of a protection cover for protecting an electronic device is provided. The attaching and detaching device includes at least one hook unit provided on the protection cover; and at least one attaching and detaching unit provided at positions corresponding to the at least one hook unit on a surface of the electronic device, and latched and fixed to or released from the at least one hook unit.

In accordance with another aspect of the present invention, an attaching and detaching device of a protection cover for protecting an electronic device is provided. The attaching and detaching device includes at least one hook unit provided on the protection cover; and at least one attachment locking unit integrated with the electronic device on a surface of the electronic device, having front opening portion, and which latch and fix the hook unit or release a latch of the hook unit to detachably attach the hook unit to the front opening portion.

In accordance with another aspect of the present invention, a keyboard attaching and detaching device of a protection cover for protecting an electronic device is provided. The keyboard attaching and detaching device includes at least one hook unit provided on one of the electronic device and the keyboard; and at least one attaching and detaching unit provided on the other of the electronic device and the keyboard, which detachably couples the keyboard with the protection cover as the attaching and detaching unit attaches to and detaches from the hook unit.

In accordance with another aspect of the present invention, an electronic device having a protection cover is provided. The electronic device includes one or more attaching and detaching units which are provided on a surface of the electronic device at positions corresponding to hook units provided on the protection cover, and wherein the attaching and detaching units latch and fix or release the hook units as the hook units are detachably attached to the attaching and detaching units.

In accordance with another aspect of the present disclosure, an electronic device is provided. The electronic device includes one or more attachment locking units which are integrated with the electronic device at a rear surface of the electronic device, have front opening portions, and latch and fix hook units of a protection cover or release the hook units as the hook units are detachably attached to the attachment and detachment units of the electronic device through the front opening portions.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described in detail. First, terms used in the description of the various embodiments of the present invention will be briefly described.

With respect to the terms used in the description of the various embodiments of the present invention, the general terms which are currently and widely used are selected in consideration of functions of structural elements in the various embodiments of the present invention. However, the meanings of the terms may be changed according to a user's intention, a judicial precedent, appearance of a new technology, and the like. In addition, in certain cases, a term arbitrarily selected may be used. In such a case, the meaning of the term will be described in detail at the corresponding part in the description herein. Therefore, the terms used in describing the various embodiments of the present invention should be defined based on the meanings of the terms and the entire invention herein, as opposed to based on merely their names.

Hereinafter, a protection cover provided to the electronic device 1 according to a first embodiment of the present invention will be described. The electronic device according to the embodiment of the present invention includes all information and communication devices and multimedia devices, such as a Portable Multimedia Player (PMP), an MP3 player, a navigation device, a game player, a laptop computer, a netbook, an advertising panel, a TV, a digital broadcasting receiver, a Personal Digital Assistant (PDA) terminal, a smart phone, a tablet PC, a Galaxy Tab, and an I-Pad, as well as all kinds of mobile communication terminals which operate according to communication protocols corresponding to various communication systems, and application devices thereof.

Figure 2:
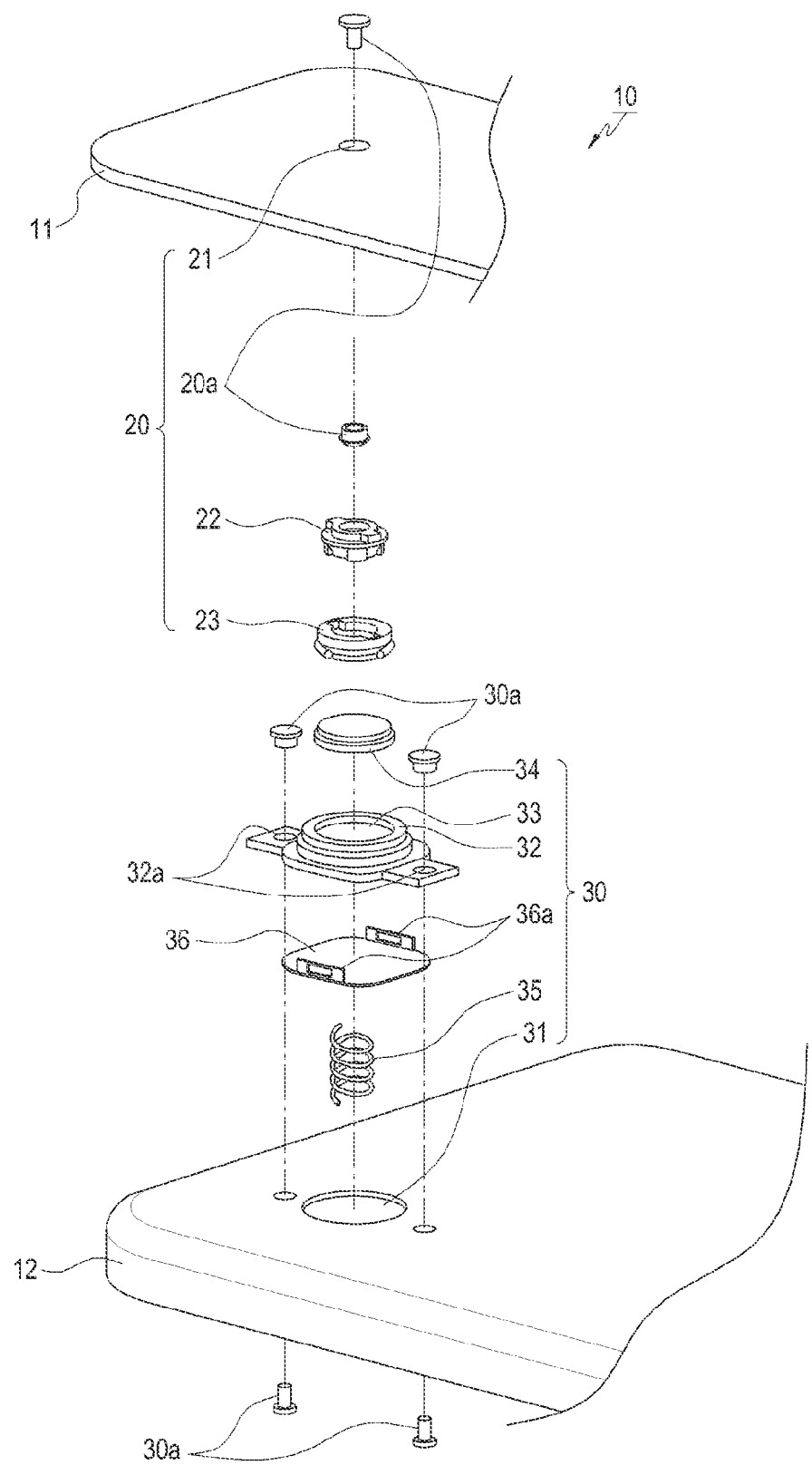
FIG. 2 is an exploded perspective view illustrating a configuration of an attaching and detaching device of a protection cover according to a first embodiment of the present invention.
Figure 3:
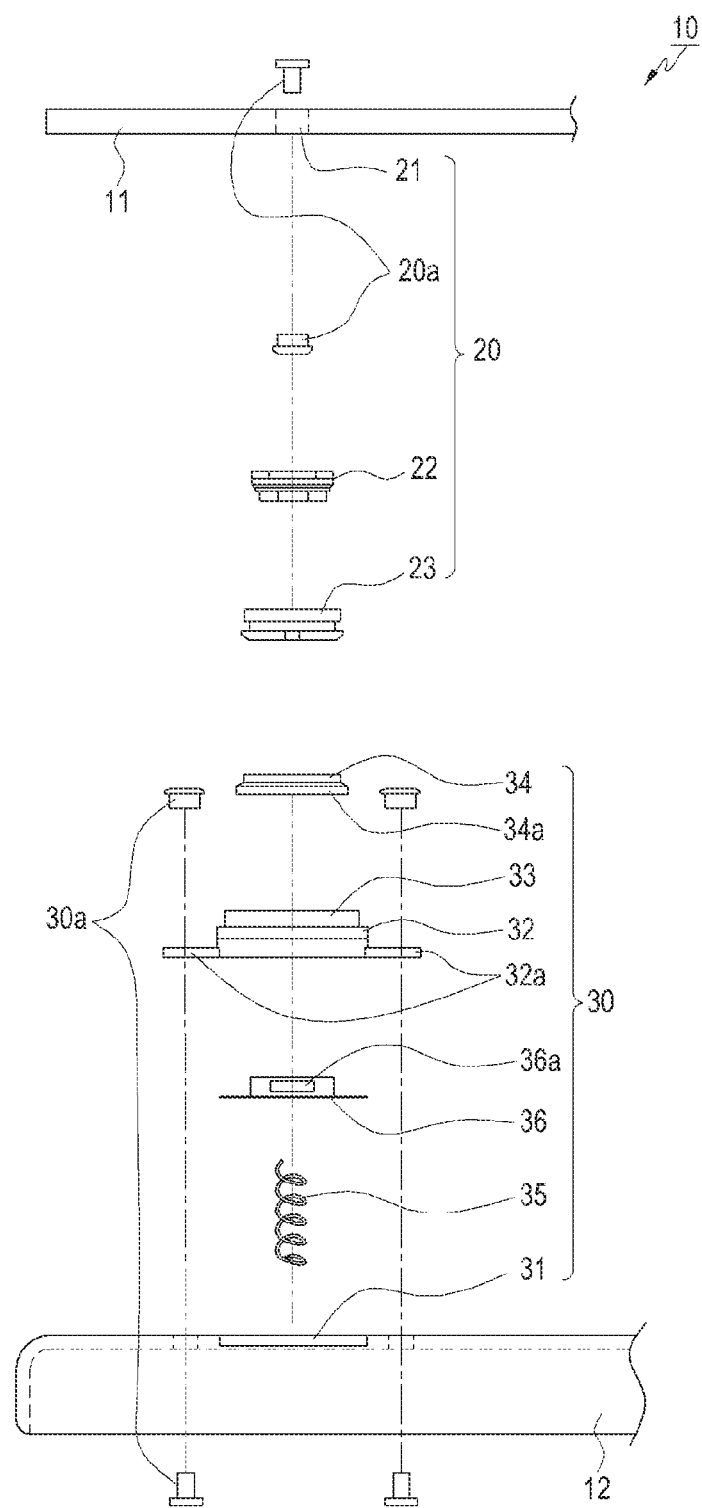
FIG. 3 is an exploded sectional view illustrating the configuration of the attaching and detaching device of the protection cover according to the first embodiment of the present invention.

FIG. 2 is an exploded perspective view illustrating a configuration of an attaching and detaching device 10 of a protection cover 11 according to a first embodiment of the present invention, and FIG. 3 is an exploded sectional view illustrating the configuration of the attaching and detaching device 10 of the protection cover 11 according to the first embodiment of the present invention.

Figure 1:
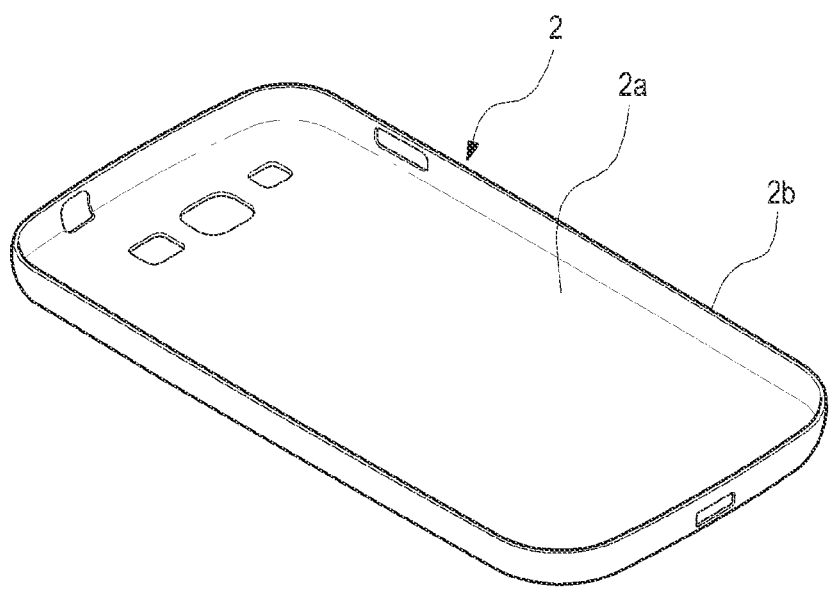
FIG. 1 is a perspective view illustrating a configuration of a protection cover according to a conventional art.

Referring to FIGS. 1 and 2, the configuration of the attaching and detaching device 10 of the protection cover 11 for protecting the electronic device 12 will be described. The attaching and detaching device 10 of the protection cover 11 includes at least one hook unit 20, and at least one detaching unit 30. The hook units 20 are provided to the protection cover 11 so as to be detachably attached to the attaching and detaching units 30 described below. The attaching and detaching units 30 are provided at positions corresponding to the hook units 20 on a rear surface of the electronic device 12 so as to latch and fix the hook units 20 or release a latch of the hook units 20.

As described above, the attaching and detaching device 10 of the protection cover 11 has a configuration in that the hook unit 20 of the protection cover 11, which does not have a conventional holding unit 2b (shown in FIG. 1) and fixing unit, can be detachably attached to the attaching and detaching unit 30 of the electronic device 12. Accordingly, it is possible to reduce a thickness and a weight of the protection cover 11 and the electronic device 12 and to make the protection cover 11 lightweight and be slim, because there is no necessity for the conventional holding unit and fixing unit enclosing a side surface of the electronic device 12.

As shown in FIGS. 1 and 2, the hook unit 20 includes a mounting unit 21, a supporting unit 22 secured to the mounting unit 21, and a latching unit 23.

The mounting unit 21 is formed in the protection cover 11, through which a screw 20a described below extends and is combined with the supporting unit 22. Here, the mounting unit 21 may have in the form of a mounting hole.

The supporting unit 22 is combined with the screw 20a, and is simultaneously provided in and combined with the latching unit 23 described below.

The latching unit 23 is provided to the protection cover 11 so as to be combined with the supporting unit 22, and is simultaneously fixed to the protection cover 11 by means of the supporting unit 22.

That is, in order to provide the hook unit 20 to the protection cover 11, first the screw 20a extends through and is combined with the mounting hole. Simultaneously, the supporting unit 22 is combined with the protection cover 11 by using the screw. In this state, the latching unit 23 is formed on the protection cover 11 and is combined with the supporting unit 22.

The supporting unit 22 and the latching unit 23 may be made, for example, of a material such as urethane resin or polycarbonate resin. However, the material of the supporting unit 22 and the latching unit 23 is not limited thereto, and the supporting unit 22 and the latching unit 23 may be made of other materials as well as the above mentioned material. For example, the supporting unit 22 and the latching unit 23 may be made of a material such as acryl resin, polyethylene resin, or polyethylene terephthalate.

As shown in FIGS. 1 and 2, the attaching and detaching unit 30 includes a seating unit 31, a button module unit 32, a button unit 34, a latching and fixing unit 33, an elastic member 35, and a supporting member 36.

The seating unit 31 is formed in a rear surface of the electronic device 12 so as to receive the button module unit 32, the button unit 34, the latching and fixing unit 33, the elastic member 35, and the supporting member 36.

The button module unit 32 is disposed in the seating unit 31, and has front and rear portions which are open. The button module unit 32 includes the button unit 34 provided on the open front portion, and the supporting member 36 provided on the open rear portion.

The latching and fixing unit 33 is disposed in the button module unit 32 so as to latch and fix the hook unit 20 in the button module unit 32 or to release the hook unit 20 from the button module unit 32 when the electronic device 12 is detachably attached to the protection cover 11.

The button unit 34 is disposed on the open front portion of the button module unit 32 and simultaneously is exposed to an outside. As the hook unit 20 is in contact with and pushes the button unit 34, the button unit 34 moves along a straight vertical line so that the hook unit 20 is detachably latched by the latching and fixing unit 33 in the button module unit 32.

The elastic member 35 is provided under the supporting member 36 in the seating unit 31, and provides an elastic force to enable the button unit 34 to move straight line.

The supporting member 36 is disposed under the button module unit 32 so as to support the elastic member 35.

That is, the hook unit 20 of the protection cover 11 is brought into contact with the button unit 34 which is disposed on the open front portion of the button module unit 32 and is exposed. In this state, when the hook unit 20 is pressed, the button unit 34 is pressed along with the hook unit 20. Accordingly, the button unit 34 is moved in a straight line direction to which the button unit 34 is pressed, and simultaneously the hook unit 20 is inserted in the button module unit 32. At this time, the hook unit 20 is latched and fixed by the latching and fixing unit 33 of the button module unit 32. In this state, when it is intended that the hook unit 20 is separated from the button module unit 32, when the hook unit 20 is pulled, the hook unit 20 is separated from the latching and fixing unit 33 of the button module unit 32, and simultaneously the button unit 34 is moved in a straight line by the elastic member 35 and returns to an initial position.

The button module unit 32 includes a pair of screw coupling units 32a to couple the button module unit 32 to the electronic device 12. The latching and fixing unit 33 may include a separation preventing member which latches a latching jaw 34a (see FIG. 3) formed on the button unit 34 so as to prevent the button unit 34 from being separated from the button module unit 32.

Further, the protection cover 11 may be made in the form of a flat plate.

Figure 8A:
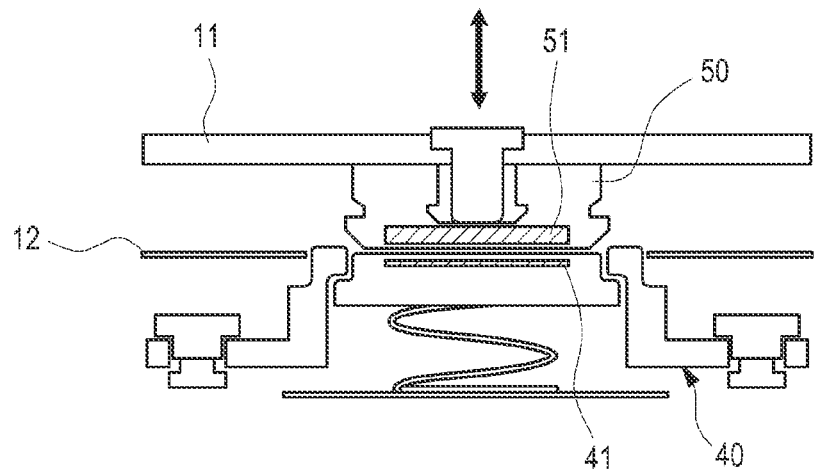
FIG. 8A is a sectional view illustrating the configuration of the attaching and detaching device according to the first embodiment of the present invention, in which a status of an example of a hook unit and an attaching and detaching unit before the operation thereof is shown.
Figure 8B:
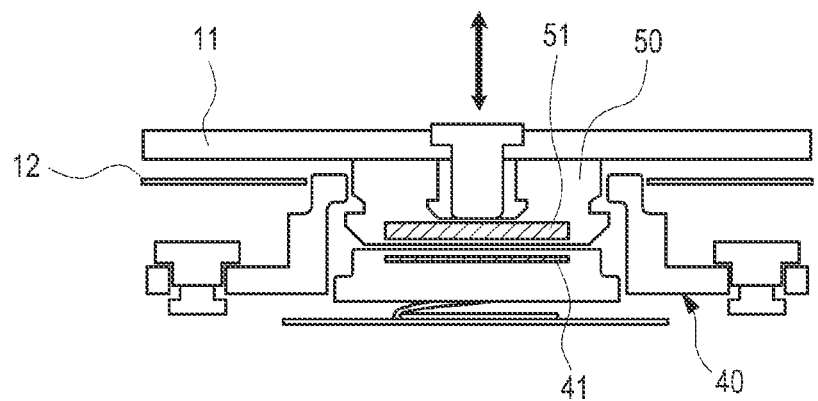
FIG. 8B is a sectional view illustrating an operation status of the hook unit and the attaching and detaching unit which are shown in FIG. 8A.

FIG. 8A is a sectional view illustrating the configuration of the attaching and detaching device of the protection cover 11 according to the first embodiment of the present invention, in which the status of another embodiment of the hook unit and the attaching and detaching unit before the operation thereof is shown, and FIG. 8B is a sectional view illustrating the configuration of the attaching and detaching device of the protection cover 11 according to the first embodiment of the present invention, in which the operation status of the hook unit and the attaching and detaching unit is shown.

Referring to FIG. 8A, first, the attaching and detaching unit 40 is provided with a metal member 41 which is in contact with and engaged with a permanent magnet 51 provided to the hook unit 50 by means of a magnetic force of the permanent magnet 51.

As shown in FIG. 8B, when the hook unit 50 of the protection cover 11 is combined with the attaching and detaching unit 40 provided to the electronic device 12, the hook unit 50 of the protection cover 11 is made to approach the attaching and detaching unit 40. At this time, when the hook unit 50 arrives within a predetermined distance from the attaching and detaching unit 40, the magnetic force of the permanent magnet 51 of the hook unit 50 enables the hook unit 50 to be in contact with the metal member 41 of the attaching and detaching unit 40.

That is, the attaching and detaching unit 40 is provided with the metal member 41 pulled by the magnetic force of the permanent magnet 51, and the hook unit 50 is provided with the permanent magnet 51 which pulls the metal member 41 by using the magnetic force.

Accordingly, when the hook unit 50 is located in the attaching and detaching unit 40, the magnetic force of the permanent magnet 51 enables the hook unit 50 to be directly combined with the attaching and detaching unit 40, thereby achieving an easy combination of the protection cover 11 and the electronic device 12.

Figure 9A:
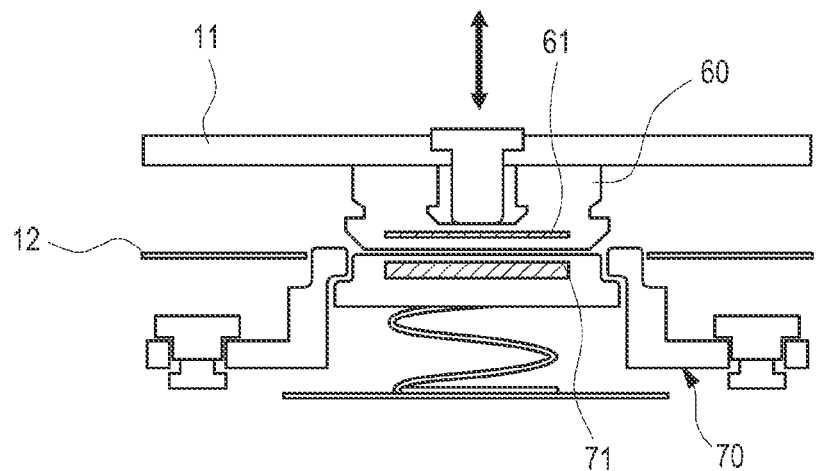
FIG. 9A is a sectional view illustrating the configuration of the attaching and detaching device according to the first embodiment of the present invention, in which a status of another example of a hook unit and an attaching and detaching unit before the operation thereof is shown.
Figure 9B:
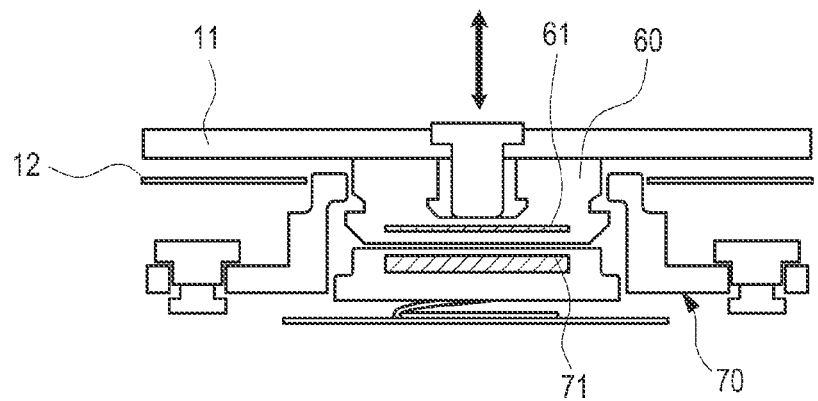
FIG. 9B is a sectional view illustrating an operation status of the hook unit and the attaching and detaching unit which are shown in FIG. 9A.

FIG. 9A is a sectional view illustrating the configuration of the attaching and detaching device of the protection cover 11 according to the first embodiment of the present invention, in which the status of another embodiment of the hook unit and the attaching and detaching unit before the operation thereof is shown, and FIG. 9B is a sectional view illustrating the configuration of the attaching and detaching device of the protection cover 11 according to the first embodiment of the present invention, in which the operation status of the hook unit and the attaching and detaching unit of FIG. 9A is shown.

Referring to FIG. 9A, first, the hook unit 60 is provided with a metal member 61 which is in contact with and engaged with a permanent magnet 71 provided to the attaching and detaching unit 70 by means of a magnetic force of the permanent magnet 71.

As shown in FIG. 9B, when it is intended that the hook unit 60 of the protection cover 11 is combined with the attaching and detaching unit 70 provided to the electronic device 12, the hook unit 60 of the protection cover 11 is made to approach the attaching and detaching unit 70. At this time, if the hook unit 60 arrives within a predetermined distance from the attaching and detaching unit 70, the magnetic force of the permanent magnet 51 of the attaching and detaching unit 70 pulls the metal member 61 of the hook unit 60 of the protection cover 11 so that the metal member 61 is coupled with the attaching and detaching unit 70 of the electronic device 12.

That is, the hook unit 60 is provided with the metal member 61 which is pulled by the magnetic force of the permanent magnet 71, and the attaching and detaching unit 70 is provided with the permanent magnet 71 which pulls the metal member 61 by using the magnetic force.

Accordingly, when the hook unit 60 is located in the attaching and detaching unit 70, the magnetic force of the permanent magnet 71 of the attaching and detaching unit 70 enables the hook unit 60 to be directly combined with the attaching and detaching unit 70, thereby easily achieving a combination of the protection cover 11 and the electronic device 12.

Figure 10A:
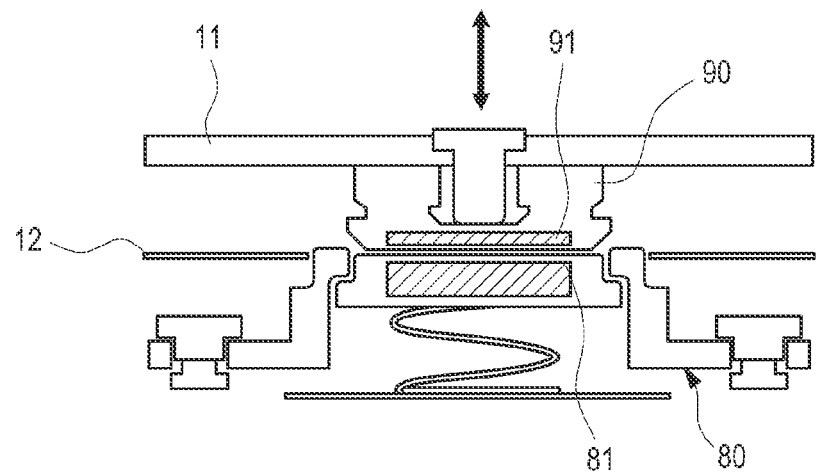
FIG. 10A is a sectional view illustrating the configuration of the attaching and detaching device according to the first embodiment of the present invention, in which a status of still another example of a hook unit and an attaching and detaching unit before the operation thereof is shown.
Figure 10B:
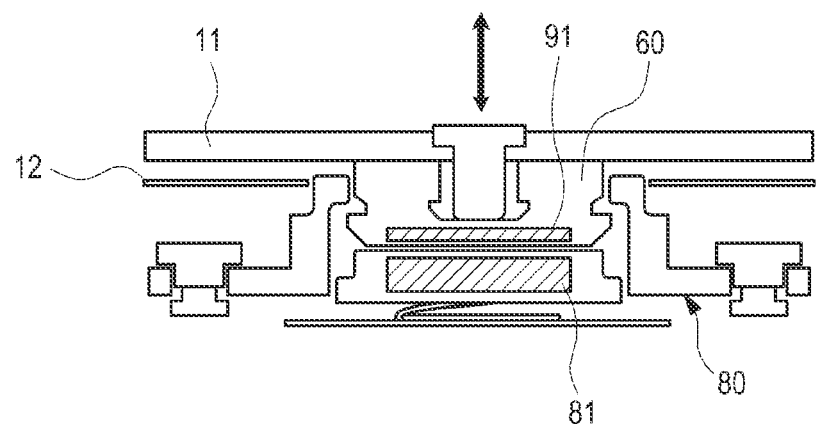
FIG. 10B is a sectional view illustrating an operation status of the hook unit and the attaching and detaching unit which are shown in FIG. 10A.

FIG. 10A is a sectional view illustrating the configuration of the attaching and detaching device of the protection cover 11 according to the first embodiment of the present invention, in which the status of another embodiment of the hook unit and the attaching and detaching unit before the operation thereof is shown, and FIG. 10B is a sectional view illustrating the configuration of the attaching and detaching device of the protection cover 11 according to the first embodiment of the present invention, in which the operation status of the hook unit and the attaching and detaching unit of FIG. 10A is shown.

Referring to FIG. 10A, first, the attaching and detaching unit 80 is provided with a coupling magnet 81 which is in contact with and engaged with a permanent magnet 91 provided to the hook unit 90 by means of a magnetic force of the permanent magnet 91.

As shown in FIG. 10B, the coupling magnet 81 of the attaching and detaching unit 80 and the permanent magnet 91 of the hook unit 90 are pulled and engaged with each other by magnetic forces. That is, the attaching and detaching unit 80 and the hook unit 90 are provided with the coupling magnet 81 and the permanent magnet 91, respectively.

In other words, when the hook unit 90 of the protection cover 11 is combined with the attaching and detaching unit 80 provided to the electronic device 12, the hook unit 90 of the protection cover 11 is made to approach the attaching and detaching unit 80. At this time, when the hook unit 90 arrives within a predetermined distance from the attaching and detaching unit 80, the magnetic forces of the coupling magnet 81 of the attaching and detaching unit 80 and the permanent magnet 91 of the hook unit 90 make 10 the hook unit 90 and the attaching and detaching unit 80 attract each other and to be engaged with each other.

Accordingly, when the hook unit 90 is located in the attaching and detaching unit 80, the coupling magnet 81 of the attaching and detaching unit 80 and the permanent magnet 91 of the hook unit 90 enable the hook unit 90 and the attaching and detaching unit 80 to be directly combined with each other, thereby easily achieving a combination of the protection cover 11 and the electronic device 12.

Referring back to FIGS. 2 and 3, a process of assembling of the attaching and detaching device of the protection cover 11 will be described. First, the screw 20a extends through the mounting unit 21 formed in the protection cover 11, the supporting unit 22 is combined with the protection cover 11 by using the screw 20a, and the latching unit 23 is combined with and fixed to the supporting unit 22.

In assembling of the attaching and detaching unit 30 with the electronic device 12, first, the button unit 34 is coupled with the front opening portion of the button module unit 32, and the supporting member 36 is coupled with the rear opening portion of the button module unit 32. In this state, then, the elastic member 35 is disposed under the supporting member 36 coupled with the rear opening portion of the button module unit 32.

That is, a latching protrusion (not shown) formed on an outer periphery of the button module unit 32 is latched onto a latching groove 36a formed in the supporting member 36. In this state, the button module unit 32 is screwed at a position near the seating unit 31 of the electronic device 12 by using the screw coupling portion 32a formed in the button module unit 32.

Figure 4:
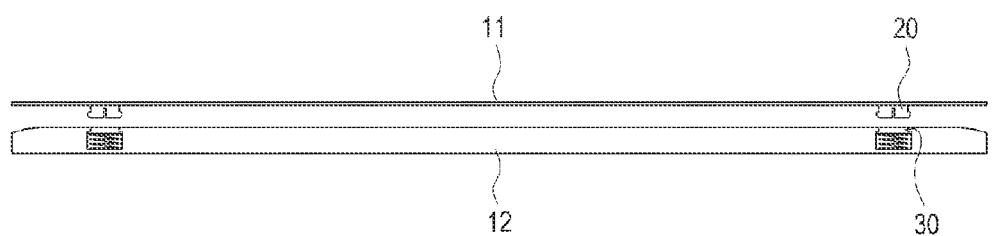
FIG. 4 is a side view illustrating a status of the attaching and detaching device of the protection cover before an operation according to the first embodiment of the present invention.
Figure 6:
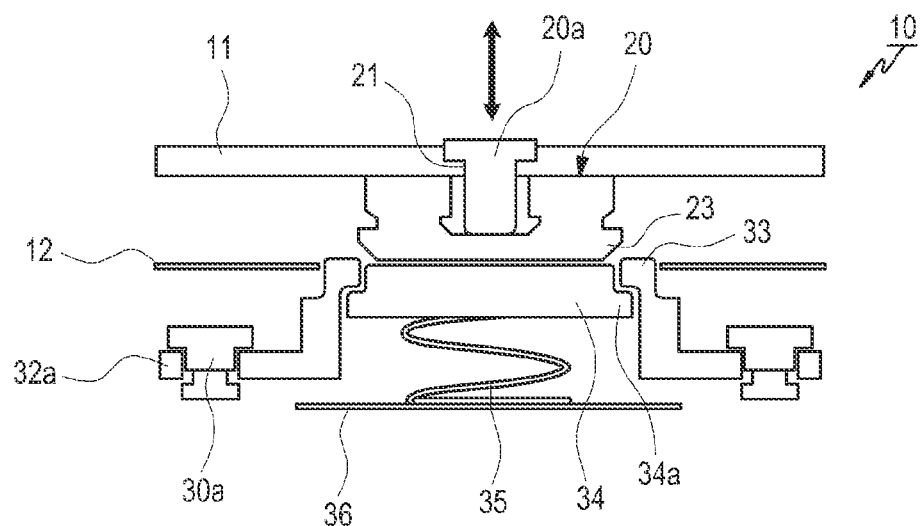
FIG. 6 is a sectional view illustrating the status of the attaching and detaching device of the protection cover before the operation according to the first embodiment of the present.
Figure 7:
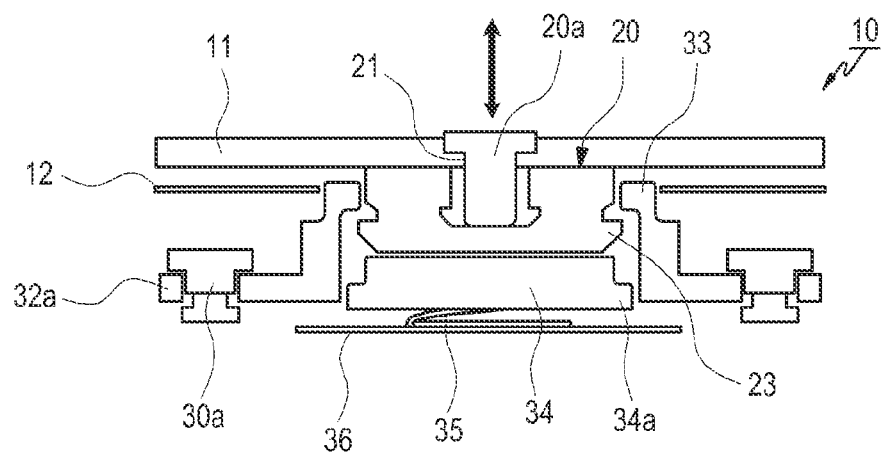
FIG. 7 is a sectional view illustrating the status of the attaching and detaching device of the protection cover after the operation according to the first embodiment of the present invention.

Hereinafter, an operation of the attaching and detaching device of the protection cover will be described in more detail. FIG. 4 is a sectional view illustrating the attaching and detaching device 10 of the protection cover 11 before an operation thereof according to the present invention, FIG. 5 is a sectional view illustrating the attaching and detaching device 10 of the protection cover 11 after the operation thereof according to the present invention, FIG. 6 is a sectional view illustrating the attaching and detaching device 10 of the protection cover 11 before the operation thereof according to the present invention, and FIG. 7 is a sectional view illustrating the attaching and detaching device 10 of the protection cover 11 according to the present invention.

Figure 5:
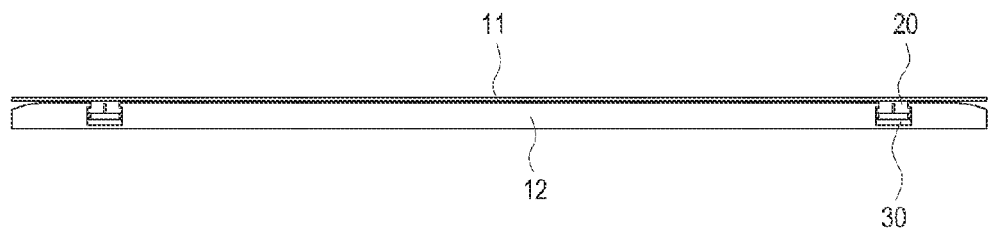
FIG. 5 is an exploded view illustrating the status of the attaching and detaching device of the protection cover after the operation according to the first embodiment of the present invention.

As shown in FIGS. 4 and 5, the protection cover 11 faces a rear surface of the electronic device 12. At this time, the hook unit 20 of the protection cover 11 is moved to be in contact with the seating unit 31 of the electronic device 12.

When the latching unit 23 of the hook unit 20 is in contact with the button unit 34 of the attaching and detaching unit 30, the hook unit 20 is pushed and pressed in a direction to the attaching and detaching unit 30. Accordingly, the latching unit 23 of the hook unit 20 enables the button unit 34 to move in the button module unit 32. At this time, the latching unit 23 of the hook unit 20 is introduced in the button module unit 32 and simultaneously the latching unit 23 of the hook unit 20 is latched onto and fixed to the latching and fixing unit 33 of the button module unit 32.

The hook unit 20 of the protection cover 11 is joined to the attaching and detaching unit 30, and simultaneously the protection cover 11 is attached to the rear surface of the electronic device 12, as seen in FIG. 5.

Here, when the protection cover 11 is separated from the rear surface of the electronic device 12, that is, the protection cover 11 is pulled away from the electronic device 12, the hook unit 20 is pulled along with the protection cover 11 and the latching unit 23 of the hook unit 20 is separated from the latching and fixing unit 33 of the attaching and detaching unit 30. At this time, the button unit 34 pressed by the hook unit 20 is raised and moved by means of the elastic member 35.

That is, the elastic member 35 expands from a state in which it is compressed and simultaneously provides an elastic force, so that the button unit 34 is raised by the elastic force. That is, the elastic force enables the button unit 34 to push against the latching unit 23 of the hook unit 20, thereby helping the latching unit 23 of the hook unit 20 to easily separate from the latching and fixing unit 33.

Therefore, the hook unit 20 of the protection cover 11 can be easily separated from the electronic device 12 with the assistance of the button unit 34 of the attaching and detaching unit 30.

In order to overcome the disadvantages of the conventional art, the protection cover 11 of the present invention is made from a flat plate which has no holding unit 2b (see FIG. 1) and the fixing units are configured to be detachably attached to the rear surface of the electronic device 12, rather than enclosing the side surfaces of the electronic device 12. Accordingly, it is possible to reduce a thickness and weight of the protection cover 11, thereby achieving slimness and making a product lightweight, while improving a grip of the electronic device 12.

Hereinafter, an attaching and detaching device 100 of the protection cover 11 according to the second embodiment of the present invention will be described with reference to FIGS. 11 and 12. In the description of the attaching and detaching device 100 of the protection cover 11 according to the second embodiment, a description of a duplicated configuration will be omitted and only a difference will be described, compared with the attaching and detaching device of the protection cover 11.

Figure 11:
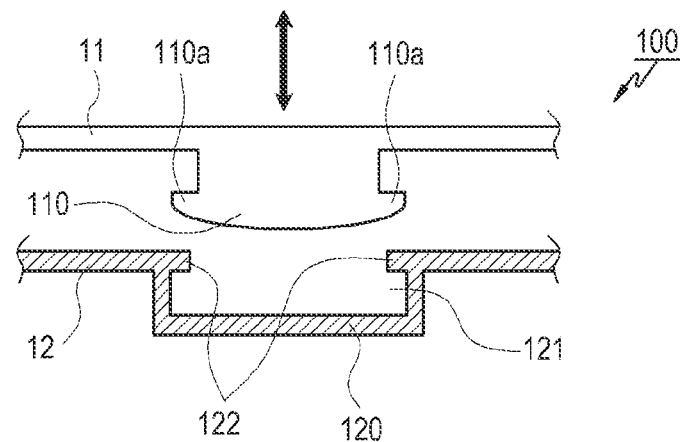
FIG. 11 is a sectional view illustrating a status of an attaching and detaching device of a protection cover before an operation according to a second embodiment of the present invention.
Figure 12:
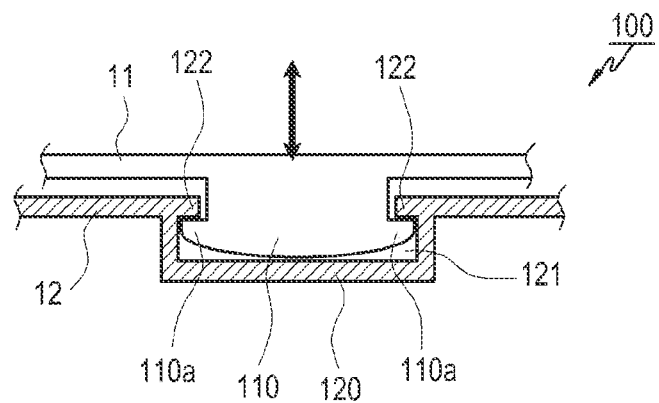
FIG. 12 is a sectional view illustrating the status of the attaching and detaching device of the protection cover after the operation according to the second embodiment of the present invention.

FIG. 11 is a sectional view illustrating an attaching and detaching device 100 of a protection cover 11 before an operation thereof according to the present invention, and FIG. 12 is a sectional view illustrating the attaching and detaching device 100 of a protection cover 11 after the operation according to the present invention. That is, FIG. 12 is a view illustrating a coupling state of a hook unit 110 and an attachment locking unit 120.

Referring to FIGS. 11 and 12, the protection cover 11 includes at least one hook unit 110 and the electronic device 12 includes at least one corresponding attachment locking unit 120. The hook units 110 are provided to the protection cover 11 so as to be detachably attached to the attachment locking units 120 as described below. The attachment locking units 120 are integrally provided to the rear surface of the electronic device 12 so as to latch and fix or release the hook units 110 when the hook units 110 are attached and detached.

That is, the attachment locking unit 120 has a front opening 121 through which the hook unit 110 may be attached to and detached from the electronic device 12.

The attachment locking unit 120 may be formed in the form of a reception groove, in which the hook unit 110 may be received.

Further, the attachment locking unit 120 is provided with a locking member 122 which is latched onto or released from a latching jaw 110a formed on the hook unit 110 as the hook unit 110 is attached and detached.

As described above, since the electronic device 12 has the attachment locking unit 120 mounted on the rear surface thereof, to which the hook unit 110 is detachably attached, the conventional holding unit 2b (see FIG. 1) enclosing a side of the electronic device and a fixing unit are unnecessary and plural parts constituting a separate attaching and detaching device are also unnecessary. Accordingly, it is possible to reduce a thickness and a weight of a product and to reduce the number of parts, thereby reducing a manufacturing cost and simplifying a manufacturing process of a product.

Here, the detailed description of the configuration and the operation of the hook unit 110 will be omitted because the hook unit 110 has the same configuration and operation as that of the hook unit 20 according to the first embodiment of the present disclosure.

At this time, the operation of the attaching and detaching device 100 of the protection cover 11 of the present embodiment will be described in more detail. As shown in FIG. 11, the hook unit 110 of the protection cover 11 faces the attachment locking unit 120 integrally formed on the rear surface of the electronic device 12, and then is inserted into the attachment locking unit 120 of which the front portion 121 is open.

The hook unit 110 is inserted into the attachment locking unit 120 at the open front portion 121, and simultaneously is latched on and fixed to the locking member 122 formed on the attachment locking unit 120.

That is, as the hook unit 110 is inserted into the attachment locking unit 120 and simultaneously is latched on and fixed to the locking member 122 of the attachment locking unit 120, the protection cover 11 is fixed to the rear surface of the electronic device 12.

Accordingly, the protection cover 11 is fixed to the rear surface of the electronic device 12, so as to protect the electronic device 12.

As shown in FIG. 12, further, when the protection cover 11 is separated from the rear surface of the electronic device 12, that is, the protection cover 11 is pulled, the hook unit 110 of the protection cover 11 is also pulled and separated from the locking member of the attachment locking unit 120. That is, when the hook unit 110 is pulled, the hook unit 110 is unlatched and simultaneously separated from the locking member 122, to separate the protection cover 11 from the electronic device 12.

In the second embodiment of the present invention, since the attachment locking unit 120 is integrally formed on the rear surface of the electronic device 12, it is possible to reduce a manufacturing cost and a manufacturing process without separate additional parts constituting the attaching and detaching device, and also to easily couple the protection cover 11 with the electronic device 12.

Hereinafter, a keyboard attaching and detaching device of a protection cover 11 for protecting the electronic device according to a third embodiment of the present invention will be described with reference to FIGS. 13 and 14. In the description of the keyboard attaching and detaching device of a protection cover 11 for protecting the electronic device according to the third embodiment, a description of a duplicated configuration will be omitted and only a difference will be described, compared with the attaching and detaching device of the protection cover 11 for protecting the electronic device 12 according to the first embodiment of the present invention.

Figure 13:
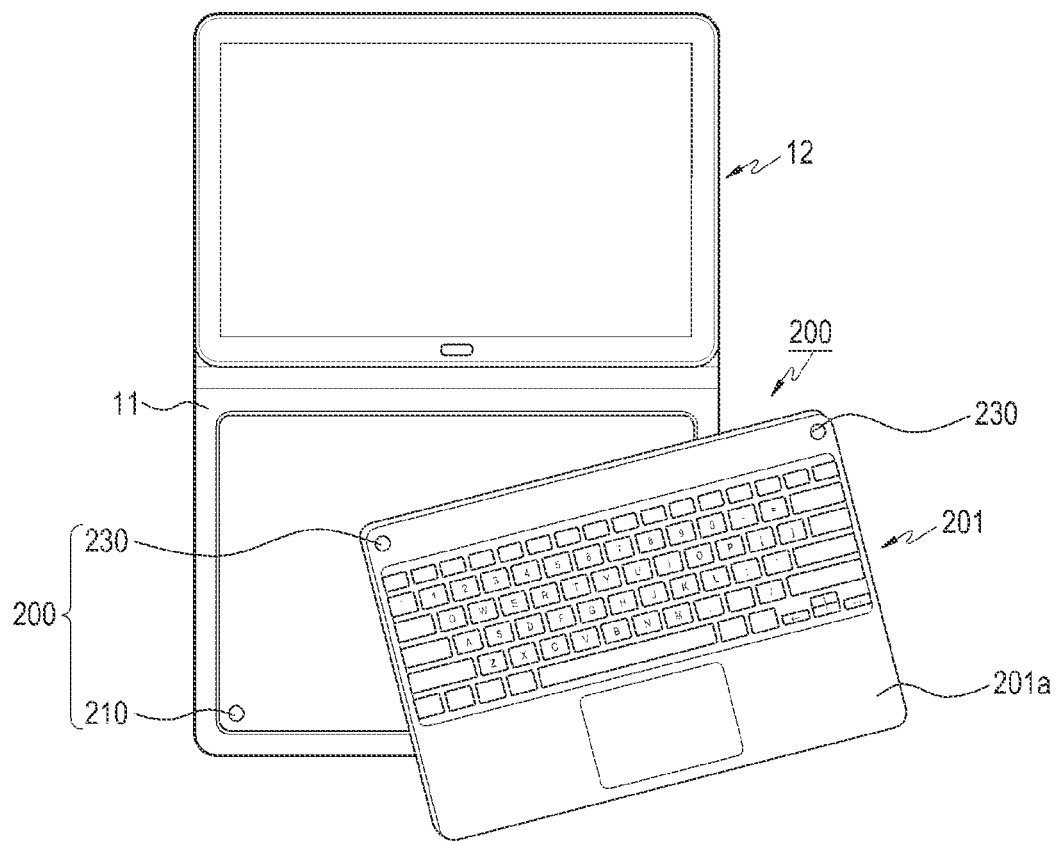
FIG. 13 is a top plane view illustrating a configuration of a keyboard attaching and detaching device of an electronic device according to a third embodiment of the present invention, in which a status of the electronic device before a hook unit provided thereto is combined with an attaching and detaching unit provided on a rear surface of the keyboard.
Figure 14:
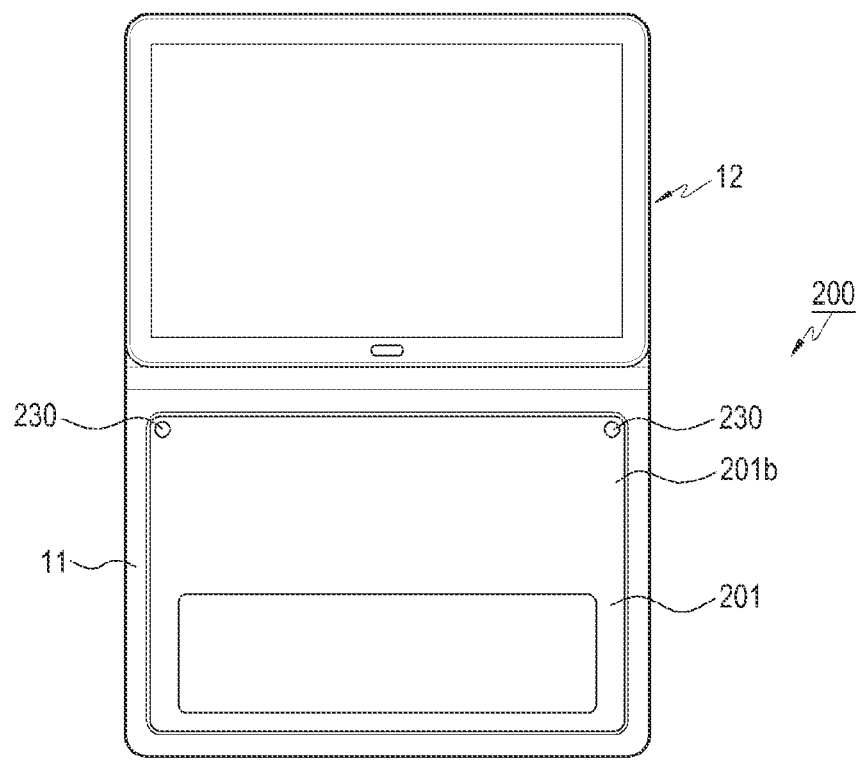
FIG. 14 is a top plane view illustrating the configuration of the keyboard attaching and detaching device of the electronic device according to the third embodiment of the present invention, in which a status of the electronic device after the hook unit provided thereto is combined with the attaching and detaching unit provided on a front surface of the keyboard is shown.

FIG. 13 is a plane view illustrating a configuration of the keyboard attaching and detaching device 200 of a protection cover 11 for protecting the electronic device 12 according to the third embodiment of the present invention, in which a state before a hook unit 210 provided on the protection cover is coupled with the attaching and detaching unit 230 provided on a rear surface of the keyboard 201 is shown, and FIG. 14 is a plane view illustrating the configuration of the keyboard attaching and detaching device of the protection cover 11 according to the third embodiment of the present invention, in which a state after the hook unit 210 provided on the protection cover 11 is coupled with the attaching and detaching unit 230 provided on a front surface of the keyboard is shown.

Referring to FIGS. 13 and 14, the keyboard attaching and detaching device 200 includes at least one hook unit 210 and at least one attaching and detaching unit 230. The hook units 210 are provided on the protection cover 11 so as to be detachably attached to the attaching and detaching units 230 described later. The attaching and detaching units 230 are provided on the front surface 201a and/or the rear surface 201b of the keyboard 201 so that the front surface 201a or the rear surface 201b of the keyboard 201 is coupled with or separated from the protection cover 11 as the hook units 210 are detachably attached to the attaching and detaching units 230.

That is, the hook unit 210 is detachably attached to the attaching and detaching unit 230 provided on the rear surface 201b of the keyboard 201, so as to fix the keyboard 201 to the protection cover 11, or is released from the rear surface 201b of the keyboard 201 so as to separate the keyboard 201 from the protection cover 11, as shown in FIG. 13.

Further, the hook unit 210 is detachably attached to the attaching and detaching unit 230 provided to the front surface 201a of the keyboard 201, so as to fix the keyboard 201 to the protection cover 11, or is released from the front surface 201a of the keyboard 201 so as to separate the keyboard 201 from the protection cover 11, as shown in FIG. 14.

Two attaching and detaching units 230 or four or more attaching and detaching units 230 may be provided to corners of the keyboard 201, respectively.

As described above, the keyboard 201 has at least one attaching and detaching unit 230 on the front surface 201a and/or the rear surface 201b thereof, which is coupled with the hook unit 210 of the protection cover 11. Accordingly, when the keyboard 201 is used, the attaching and detaching units 230 provided on the rear surface 201b of the keyboard 201 are coupled with the hook units 210, so that keys of the keyboard 201 are exposed to an outside as in FIG. 13. On the other hand, when the keyboard 201 is not used, the attaching and detaching units 230 provided on the front surface 201a of the keyboard 201 are coupled with the hook units 210, so that the keys of the keyboard 201 are not exposed to the outside as in FIG. 14. Therefore, it is possible to protect the keys of the keyboard 201, and to freely couple and separate the keyboard 201 with/from the protection cover 11, thereby improving use efficiency of the keyboard 201.

As shown in FIG. 13, the attaching and detaching units 230 provided on the rear surface 201b of the keyboard 201 are combined with the hook units 210 provided on the protection cover 11.

At this time, the hook unit 210 is inserted into the attaching and detaching unit 230, and simultaneously is latched on and fixed to the attaching and detaching unit 230, so that the keyboard 201 is fixed to the protection cover 11. The front surface 201a of the keyboard 201 is exposed to the outside.

Further, when that the keyboard 201 is separated from the protection cover 11, the keyboard 201 is pulled, and the attaching and detaching unit 230 formed in the rear surface 201b of the keyboard 201 is separated from the hook unit 210 of the protection cover 11, and simultaneously the keyboard 201 is separated from the protection cover 11.

On the other hand, when the front surface 201a of the keyboard 201 is coupled with the hook unit 210 provided on the protection cover 11, as shown in FIG. 14, the attaching and detaching unit 230 provided on the front surface 201a of the keyboard is coupled with the hook unit 210 provided on the protection cover 11.

At this time, the hook unit 210 is inserted into the attaching and detaching unit 230 provided on the front surface 201a of the keyboard 201, and simultaneously is latched on and fixed to the attaching and detaching unit 230, so that the keyboard 201 is fixed to the protection cover 11, with the rear surface 201b of the keyboard 201 exposed to the outside. In other words, the front surface 201a of the keyboard 201 is not exposed to the outside because it faces a bottom surface of the protection cover 11.

Further, when the keyboard 201 is separated from the protection cover 11, the keyboard 201 is pulled, and the attaching and detaching unit 230 formed in the front surface 201a of the keyboard 201 is separated from the hook unit 210 of the protection cover 11, and simultaneously the keyboard 201 is separated from the protection cover 11.

As described above, since one or more attaching and detaching units are configured on the front surface and/or the rear surface of the keyboard so as to be detachably attached to the hook units of the electronic device, it is possible to attach or separate the keyboard to/from the electronic device according to an intended use.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An attaching and detaching device of a protection cover for protecting an electronic device, the attaching and detaching device comprising:
   at least one hook unit provided on the protection cover; and at least one attaching and detaching unit which is provided at positions corresponding to the at least one hook unit on a surface of the electronic device, latched and fixed to or released from the at least one hook unit, and which moves in a straight line direction by an elastic force when the attaching and detaching unit is attached to and detached from the at least one hook unit, wherein the at least one attaching and detaching unit comprises:

a button module unit that is provided in the electronic device;

a latching and fixing unit which is provided in the button module unit, and latches the hook unit or releases a latch of the hook unit when the hook unit is attached to or detached from the button module unit; and a button unit which is exposed to an outside, and moves in a straight line direction by an elastic member so that the hook unit is detachably attached to the button module unit.

2. The attaching and detaching device as claimed in claim 1, wherein the hook unit comprises:

a mounting unit formed in the protection cover;

a supporting unit secured to the mounting unit; and a latching unit which is provided on the protection cover, and is combined with the supporting unit, so as to be fixed to the protection cover by the supporting unit.

3. The attaching and detaching device as claimed in claim 1, wherein the supporting unit and the latching unit is made of at least one of urethane and polycarbonate.

4. The attaching and detaching device as claimed in claim 1, wherein the attaching and detaching unit comprises:

a seating unit formed in a rear surface of the electronic device;

wherein the button module unit which is provided in the seating unites has a front opening portion and a lower opening portion; and a supporting member which is disposed under the button module unit and supports the elastic member.

5. The attaching and detaching device as claimed in claim 4, wherein the latching and fixing unit includes a separation preventing member which is latched onto a latching jaw formed on the button unit and prevents the button unit from being separated from the button module unit.

6. The attaching and detaching device as claimed in claim 1, wherein the protection cover is formed in a flat plate.

7. The attaching and detaching device as claimed in claim 1, wherein the attaching and detaching unit comprises a metal member which is in contact with and is engaged with a permanent magnet disposed on the hook unit by means of a magnetic force of the permanent magnet.

8. The attaching and detaching device as claimed in claim 1, wherein the hook unit comprises a metal member which is in contact with and is engaged with a permanent magnet disposed on the attaching and detaching unit by means of a magnetic force of the permanent magnet.

9. The attaching and detaching device as claimed in claim 1, wherein the attaching and detaching unit comprises a coupling magnet which is in contact with and is engaged with a permanent magnet disposed on the hook unit by means of magnetic forces of the permanent magnet and the coupling magnet.

10. An attaching and detaching device of a protection cover for protecting an electronic device, the attaching and detaching device comprising:

at least one hook unit provided on the protection cover; and at least one attachment locking unit integrated with the electronic device on a surface of the electronic device, having a front opening portion, and latches and fixes the hook unit or releases a latch of the hook unit to detachably attach the hook unit to the front opening portion when the at least one hook unit is moved in a straight line direction, wherein the protection cover includes at least one of a keyboard, a cradle, a flip cover, and other accessories, wherein the at least one attachment locking unit comprises:

a button module unit that is provided in the electronic device;

a latching and fixing unit which is provided in the button module unit, and latches the hook unit or releases a latch of the hook unit when the hook unit is attached to or detached from the button module unit; and a button unit which is exposed to an outside, and moves in a straight line direction by an elastic member so that the hook unit is detachably attached to the button module unit.

11. The attaching and detaching device as claimed in claim 10, wherein the attachment locking unit has a receiving groove which receives the hook unit.

12. The attaching and detaching device as claimed in claim 10, wherein the attachment locking unit further comprises a locking member which latches a latching jaw formed on the hook unit or releases a latch of the hook unit as the hook unit is detachably attached to the attachment locking unit.

13. A keyboard attaching and detaching device of a protection cover for protecting an electronic device, the keyboard attaching and detaching device comprising:

at least one hook unit provided to the protection cover; and at least one attaching and detaching unit which is provided to a front surface or a rear surface of the keyboard, and which moves in a straight line direction by an elastic force when the attaching and detaching unit is attached to and detached from the hook unit and couples/separates the front surface or the rear surface of the keyboard with/from the protection cover, wherein the at least one attaching and detaching unit comprises:

a button module unit that is provided in the electronic device;

a latching and fixing unit which is provided in the button module unit, and latches the hook unit or releases a latch of the hook unit when the hook unit is attached to or detached from the button module unit; and a button unit which is exposed to an outside, and moves in a straight line direction by an elastic member so that the hook unit is detachably attached to the button module unit.

14. The keyboard attaching and detaching device as claimed in claim 13, wherein the hook unit is provided on the protection cover and the attaching and detaching unit is provided on a front surface and a rear surface of the keyboard, to attach and detach the keyboard with the keys exposed or protected.

15. The keyboard attaching and detaching device as claimed in claim 13, wherein the hook unit is detachably attached to the attaching and detaching unit disposed on a front surface of the keyboard and latches or releases the front surface of the keyboard onto/from the protection cover.

16. The keyboard attaching and detaching device as claimed in claim 13, wherein the hook unit is detachably attached to the attaching and detaching unit disposed on a rear surface of the keyboard and latches or releases the rear surface of the keyboard onto/from the protection cover.

17. The keyboard attaching and detaching device as claimed in claim 13, wherein attaching and detaching unit is disposed at corners of the keyboard.

18. The keyboard attaching and detaching device as claimed in claim 13, wherein the hook unit comprises:
   a mounting unit;
   a supporting unit secured to the mounting unit; and
   a latching unit combined with the supporting unit, so as to be fixed to one of the protection cover and the keyboard by the supporting unit.

19. The keyboard attaching and detaching device as claimed in claim 13, wherein the attaching and detaching unit comprises:
   a seating unit;
   wherein the button module unit which is provided in the seating unit has a front opening portion and a lower opening portion; and
   a supporting member which is disposed under the button module unit, and supports the elastic member.

20. An electronic device having a protection cover, the electronic device comprising:
   one or more attaching and detaching units which are provided on a surface of the electronic device at positions corresponding to hook units provided on the protection cover, and wherein the attaching and detaching units move in a straight line direction by an elastic force as the hook units are detachably attached to the attaching and detaching units, and latch and fix or release the hook units, wherein the protection cover includes any one of a keyboard, a cradle, a flip cover, and other accessories,
   wherein the one or more attaching and detaching units comprise:
   a button module unit that is provided in the electronic device;
   a latching and fixing unit which is provided in the button module unit, and latches the hook unit or releases a latch of the hook unit when the hook unit is attached to or detached from the button module unit; and
   a button unit which is exposed to an outside, and moves in a straight line direction by an elastic member so that the hook unit is detachably attached to the button module unit.

21. An electronic device comprising:
   one or more attachment locking units which are integrated with the electronic device at a rear surface of the electronic device, have front opening portions, and latches and fixes a hook unit of a protection cover or releases a latch of the hook unit to detachably attach the hook unit to the front opening portion when the hook unit is moved in a straight line direction,
   wherein the protection cover includes any one of a keyboard, a cradle, a flip cover, and other accessories,
   wherein the one or more attachment locking units comprise:
   a button module unit that is provided in the electronic device;
   a latching and fixing unit which is provided in the button module unit, and latches the hook unit or releases a latch of the hook unit when the hook unit is attached to or detached from the button module unit; and
   a button unit which is exposed to an outside, and moves in a straight line direction by an elastic member so that the hook unit is detachably attached to the button module unit.

\* \* \* \* \*